A. G. SCHLEHER, Jr.
FLUID TESTER.
APPLICATION FILED JUNE 18, 1915.

1,184,880.

Patented May 30, 1916.

Witnesses

Inventor
Albert G. Schleher, Jr.,
By J. Stuart Freeman.
Attorney

UNITED STATES PATENT OFFICE.

ALBERT G. SCHLEHER, JR., OF PHILADELPHIA, PENNSYLVANIA, ASSIGNOR TO SCHLEHER ENGINEERING COMPANY, OF PHILADELPHIA, PENNSYLVANIA.

FLUID-TESTER.

1,184,880. Specification of Letters Patent. Patented May 30, 1916.

Application filed June 18, 1915. Serial No. 34,790.

*To all whom it may concern:*

Be it known that I, ALBERT G. SCHLEHER, Jr., a citizen of the United States, and a resident of the city of Philadelphia, county of Philadelphia, and State of Pennsylvania, have invented certain new and useful Improvements in Fluid-Testers, of which the following is a full, clear, and exact description.

The object of the invention is to provide a simple and highly efficient machine for testing fluids, and particularly oils designed for lubricating purposes, though it may be employed to determine the relative consistencies, specific gravities, etc., of various other classes of fluids.

Another object is to provide a mechanism for the purpose described, which comprises essentially a cylinder having a smooth peripheral surface, means to revolve the same while in contact with a fluid within a receptacle, a weight provided with a smooth concave surface conforming to the curved surface of said cylinder, means to yieldingly maintain said weight in a given position, and means to indicate the relative displacement of said weight about said cylinder, as a result of the frictional coöperation of said curved surfaces as the friction existing therebetween is altered in degree by various lubricants supplied to the surface of said cylinder from said receptacle.

Further objects and advantages of the details of the invention are fully brought out in the following description when read in conjunction with the accompanying drawings, in which—

Figure 1:
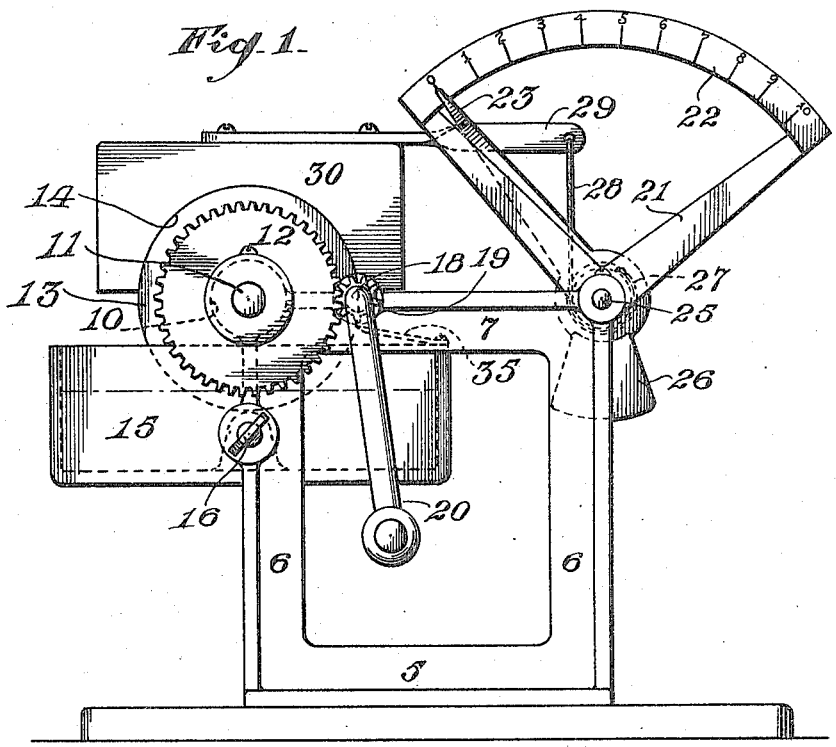
Figure 2:
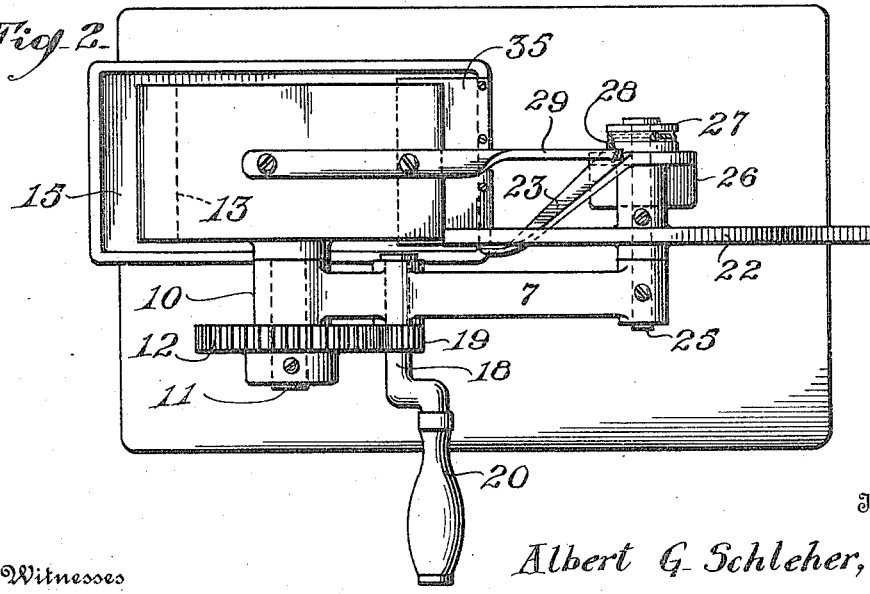

Figure 1 is a front elevation of the preferred embodiment of the invention; and Fig. 2 is a top plan view of the same.

Referring to the drawings, the preferred construction embodies a frame, comprising a base 5, integral, upwardly extending, substantially parallel supports 6, connected at their upper end portions by a member 7. Provision is made for securing this frame in any desired manner to a suitable base, such for instance as a bench, table, or the like.

Forming an integral part of the frame is an enlargement 10, drilled transversely to form a bearing through which is journaled a shaft 11, secured to the forward end of which is a gear wheel 12, while carried by the other end portion is either a solid, or hollow, cylindrical drum 13, provided with a smooth peripheral surface 14, said drum extending into a receptacle 15, adapted to hold the lubricant to be tested, and removably secured by suitable means 16 to one of the supports 6.

Journaled in a preferably enlarged portion of the member 7 is a crank shaft 18, carrying a relatively small pinion 19 and having secured to its outer end portion a crank 20, or other suitable driving means, such as a belt-pulley or the like. Adjustably secured to the member 7 preferably at its juncture with the second of the upright supports 6, is a sector 21, provided with a graduated dial 22, across which is mounted to oscillate an indicating pointer 23. The said pointer is preferably carried loosely upon a shaft 25, journaled in said frame, and provided with a weight 26, operative to yieldingly maintain said pointer in the position marked "0" on the dial. The shaft 25 also carries a suitable grooved pulley 27 around which is normally wound one end portion of the flexible connecting member 28, secured at its opposite end to the free end portion of an arm 29, secured to, and operative to move with, a weight 30, provided with a smooth, concave surface upon its under side, adapted to conform exactly with the corresponding surface of the drum 13. The sector is shown in the drawings as adjustably secured to the shaft 25.

In the operation of this device, a sample quantity of the lubricant to be tested is placed in the receptacle 15, and with the weight 26 normally maintaining the friction weight 30 in substantially centrally horizontal position upon the drum 13, and the pointer being at zero ("0"), the crank or similar means 20 is revolved in a clockwise direction (as viewed in Fig. 1), whereupon the said drum revolves in the reverse direction, carrying a film of the said lubricant upward between itself and the friction weight, the thickness of the said film being regulated as desired by an adjustable wiper 35, preferably made of metal, and, having a true edge conforming exactly to the surface of the drum. Without any lubricant between the said drum and weight, the latter tends to follow the former as it revolves, and consequently by means of the flexible connection 28 draws the pointer across the dial. However, if an efficient lubricant is placed within the receptacle, the former upon entering between the coöperating drum and weight surfaces, lessens the friction therebetween and the yielding weight 26 successfully retards the movement of the pointer across the dial and comes to rest at a definite point. Assuming that this lubricant is a standard, or one of a definite quality, the relative lubricating quality of another oil, or the like, may be found by cleansing the receptacle of the first and substituting therefor the second, and noting the position at which the pointer comes to rest when operating the device.

The construction hereinbefore described is a device embodying the invention in its preferred form, but numerous details thereof may be changed to such an extent that the inventor desires to anticipate any form falling within the scope of the appended claims.

Having thus described my invention, what I claim and desire to protect by Letters Patent of the United States is:

1. A testing machine comprising a revoluble drum, a receptacle into which the surface of said drum passes upon being revolved, a weight conforming with and frictionally engaging the peripheral surface of said drum, means to return said weight to a given position after it has been removed therefrom by the movement of said drum, and an indicator to indicate the movement of said weight.

2. A testing machine comprising a drum, means to revolve said drum at a given speed, a weight coöperating with the peripheral surface of said drum, means actuated by gravity to yieldingly maintain said weight in a given normal position, means to indicate the displacement of said weight as said drum is revolved, and a receptacle into which the surface of said drum enters as the latter revolves.

3. A testing machine comprising a drum, a receptacle for containing a lubricant and into which the surface of said drum enters, a wiper for limiting the amount of lubricant adhering to said drum, means frictionally engaging the surface of said drum and movable therewith, means to yieldingly maintain said first means in a given position, and means to indicate the displacement of said first-named means from said position.

4. A testing machine comprising a drum, a receptacle for containing a lubricant and through which the surface of said drum passes, an adjustable wiper for regulating the quantity of said lubricant taken up by the surface of said drum, means to drive said drum, means actuated by gravity to engage the surface of said drum, means to yieldingly maintain said first means in a given position, and means to indicate the displacement of said first means from said position, as said drum is revolved.

In witness whereof, I have hereunto set my hand this 16th day of June, 1915.

ALBERT G. SCHLEHER, Jr.

Witnesses:
J. STUART FREEMAN,
N. O. FREEMAN.

Copies of this patent may be obtained for five cents each, by addressing the "Commissioner of Patents, Washington, D. C."